United States Patent [19]

Moss et al.

[11] 4,180,643

[45] Dec. 25, 1979

[54] ACRYLAMIDE OR METHACRYLAMIDE QUATERNARY COMPOUNDS

[75] Inventors: Philip H. Moss; Edward C. Y. Nieh, both of Austin, Tex.

[73] Assignee: Texaco Development Corp., White Plains, N.Y.

[21] Appl. No.: 961,178

[22] Filed: Nov. 16, 1978

[51] Int. Cl.² .......................................... C07C 103/58
[52] U.S. Cl. ................... 528/52; 260/561 N; 521/128; 428/425
[58] Field of Search ................... 260/561 N; 521/128; 528/52

[56] References Cited

U.S. PATENT DOCUMENTS

| | | | |
|---|---|---|---|
| 3,652,671 | 3/1972 | Barron | 560/561 N |
| 3,666,810 | 5/1972 | Hoke | 560/561 N |
| 3,878,247 | 4/1975 | Moss et al. | 260/561 N |
| 3,892,687 | 7/1975 | Bechara et al. | 528/52 |
| 3,957,689 | 5/1976 | Nagy | 560/561 N |
| 3,962,332 | 6/1976 | Trapasso | 260/561 N |
| 4,031,138 | 6/1977 | Nieh et al. | 521/128 |

*Primary Examiner*—Arthur P. Demers
*Attorney, Agent, or Firm*—Carl G. Ries; Robert A. Kulason; James L. Bailey

[57] ABSTRACT

Covers a new composition of matter comprising an acrylamide or methacrylamide monomer characterized by the following structural formula:

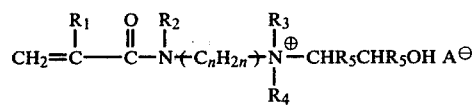

where $R_1$, $R_2$ and $R_5$ are hydrogen or methyl, $R_3$ and $R_4$ are lower alkyl, n is an integer ranging from 1 to 6 and A represents an anion.

5 Claims, No Drawings

ACRYLAMIDE OR METHACRYLAMIDE QUATERNARY COMPOUNDS

BACKGROUND OF THE INVENTION

1. Field of the Invention

This invention relates to novel acrylamide or methacrylamide monomers.

2. Description of the Prior Art

Cationic monomers of the acrylamide or methacrylamide type are known as typically set art in U.S. Pat. Nos. 4,031,138; 2,567,836; 2,595,907; 3,652,671; 3,661,868; 3,671,472 and 3,878,247. Specifically, quaternaries of this type are set out in U.S. Pat. Nos. 3,666,810 and 2,834,758; British Patent number 1,281,683 and by J. E. Boothe et al J. Macromol. Sci., A 10(8) 1541 (1976). However, there is an ever-continuing effort to find novel materials of this type which may show unique utilities in areas of application not possessed by similar prior art materials of this class.

It is the object of the invention to prepare a new class of cationic acrylamides and methacrylamides which are useful in a wide variety of end-uses normally calling for ionically charged monomers of this type.

SUMMARY OF THE INVENTION

The invention relates to acrylamide or methacrylamide monomers characterized by the following formula:

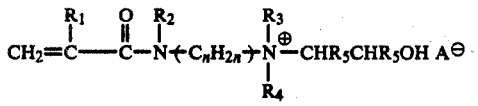

where $R_1$, $R_2$ and $R_5$ are hydrogen or methyl, $R_3$ and $R_4$ are lower alkyl, n is an integer ranging from 1 to 6 and A represents an anion.

DESCRIPTION OF THE PREFERRED EMBODIMENTS

The compounds of the invention described above may be prepared utilizing a number of known synthetic techniques. One typical mode of preparation involves first providing an acrylic or methacrylic compound having the structure:

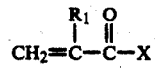

where X is halo, OH or —$OR_5$ where $R_5$ is lower alkyl, with $R_1$ being hydrogen or methyl. The acrylic or methacrylic reactant compound thus may be an acid, an acid ester or acid halide. When an acid halide is employed it is preferred that an acid chloride be utilized such that X in the above formula is chloro. When the ester form is utilized it is greatly preferred that the methyl or ethyl ester be used as a reactant.

The above acrylic or methacrylic compounds are then reacted with an amine having the structure;

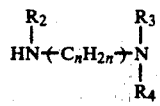

where $R_2$, $R_3$, and $R_4$, and n have a significance as just described. $R_3$ and $R_4$ are lower alkyl and it is preferred that they contain 1–4 carbon atoms, and most preferably are methyl or ethyl.

In a final step the thus formed amino acrylamide or methacrylamide is then quaternarized in the presence of an organic or inorganic acid by reaction with ethylene oxide, propylene oxide or mixtures of the two. The reaction of an oxide with a basic nitrogen atom such as tertiary amine to form a quaternary moiety is well known to those skilled in the art and, needs little elaboration. This reaction may be carried out over a wide temperature range, say within 50°–200° C. The reaction is preferably conducted in a closed vessel under pressure. The particular pressure employed is not critical and autogenous pressures are generally used. Usually the acid is first added to the aminoamide followed by addition of oxide. However, acid, aminoamide, and oxide may be reacted by simultaneous addition to one other.

A wide variety of organic or inorganic acids may be employed, and thus A in the above formula defining the final products may represent anionic radicals such as halo including chloride, bromide, or iodide, mono-, di-, or tri-basic phosphate, acetate, lactate, gluconate, sulfate, nitrate, nitrite, alkylsulfate, alkyl and arylsulfonates, e.g., dipropylnapthalenesulfonate, dibutylnapthalenesulfonate, methyl-, ethyl-, propyl-, butyl-, octyl-, or dodecylbenzenesulfonate, formate, propionate, oxalate, laurate, phenylsulfonate, benzoate, borate, carbonate, etc. Preferred acids include acetic acid, hydrochloric acid, and sulfuric acid.

Usually the reaction between the aminoamide, acid and oxide is conducted in an aqueous solution, most often water itself, although mixtures of water and polar materials such as methanol, ethanol, isopropanol, and the like may be employed.

The following examples illustrate preparation of typical compounds falling within the scope of the invention. It is understood that these examples are merely illustrative and that the invention is not to be limited thereto.

EXAMPLE I

In a one liter three neck flask equipped with stirrer, thermometer, and addition funnel were charged N-(3-dimethylaminopropyl) methacrylamide (DMAPMA), 170 g; acetic acid, 60 g; and deionized water, 92 g. After the acid salt solution was heated to 50° C., propylene oxide, 60 g, was added over a period of 30 minutes. The reaction mixture was digested at 50° C. for 30 minutes. The hydroxyalkyl quarternary ammonium compound corresponding to structure I was formed in 96% yield.

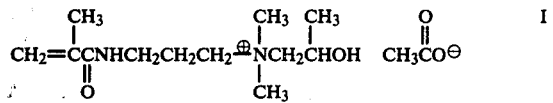

EXAMPLE II

By a procedure similar to Example I, the hydrochloride salt of DMAPMA was reacted with one equivalent of propylene oxide. Yields of quaternary ammonium chlorides structure I above and structure II below were 52 and 35% respectively. Unconverted DMAPMA acid chloride, 13%, was also found in the reaction mixture.

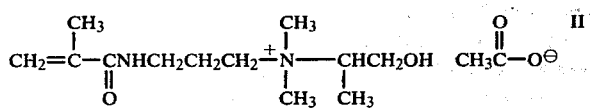

EXAMPLE III

To a 1600 ml kettle was charged DMAPMA, 170 g, acetic acid, 60 g, and water, 176 g. After the acid salt solution was brought to 50° C., ethylene oxide, 44 g, was added over a period of one hour. Maximum pressure developed in the kettle was 12 psi. The reaction mixture was digested at 50° C. for 30 minutes. Yield of the quaternary ammonium acetate below was 95%.

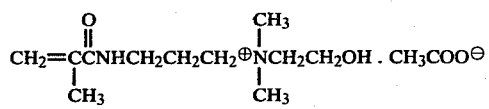

EXAMPLES IV-XII

Acetic, hydrochloric and sulfuric acid salts of DMAPMA were converted to the desired quaternary ammonium salts by ethylene oxide or propylene oxide. Results are summarized in Table I.

TABLE I

| EXAMPLE | 4 | 5 | 6 | 7 | 8 | 9 | 10 | 11 | 12 |
|---|---|---|---|---|---|---|---|---|---|
| REAGENT | | | | | | | | | |
| DMAPMA | 170 | 170 | 170 | 170 | 170 | 170 | 170 | 170 | 170 |
| acetic acid | — | 60 | — | — | 60 | — | — | — | — |
| hydrochloric acid | — | — | 36.5 | — | — | 36.5 | 36.5 | — | — |
| sulfuric acid | 49 | — | — | 49 | — | — | — | 49 | 49 |
| ethylene oxide | — | — | — | — | 50 | 44 | 66 | 44 | 66 |
| propylene oxide | 60 | 66 | 100 | 100 | — | — | — | — | — |
| water | 174 | 192 | 185 | 182 | 176 | 201 | 182 | 187 | 164 |
| CONVERSION | 75 | >95 | >95 | >95 | >95 | >95 | >95 | 86 | >95 |
| yield of product I | 37 | <90 | 57 | 47 | 95 | 95 | 95 | 86 | 95 |
| yield of product II | 37 | <5 | 38 | 47 | — | — | — | — | — |

As shown below the quaternary salts are active catalysts in preparing rigid polyisocyanurate foams. The "A" component consisted of a polyisocyanate, MONDUR ® MR available from Mobay Chemical Co. This polyisocyanate is a mixture of polyaryl isocyanates containing methylenediphenyl diisocyanate and higher functional isocyanates. THANOL ® TR-380 polyol available from Jefferson Chemical Co., Inc. is a 6.5 mole ethylene oxide adduct of aniline having a hydroxyl number of 295. Freon R-11-B is a trichlorofluoromethane blowing agent available from Dupont. Silicone DC-193 is a surfactant available from Dow Corning which is a siliconeglycol polymer. Results are shown below.

EXAMPLE XIII

To show catalyst utility of a typical compound of this invention a 30% solution of methacrylamidopropylhydroxyethyldimethalammonium acetate in diethylene glycol was prepared by mixing the product made in Example III, 70 g, and diethylene glycol 100 g, followed by stripping out water. The quaternary ammonium acetate in diethyleneglycol was then used as a catalyst in the preparation of an index five isocyanurate foam. The following compounds were used in the formulation.

| INGREDIENT | WEIGHT, g |
|---|---|
| THANOL TR 380 | 18.8 |
| Silicone DC-193 | 0.5 |
| R 11B | 12.5 |
| Quaternary Ammonium Catalyst Solution | 1.7 |
| MONDUR MR ® | 66.0 |

All of the above ingredients were stirred rapidly at room temperature, as MONDUR MR ® was quickly poured into the mixture. After mixing, the blend was poured into a box. Cream time, rise time and tack free time were 5, 42, and 50 seconds respectively.

The compounds of the invention here are also excellent flocculating agents. This utility is illustrated below.

EXAMPLE XIV

A homo-polymer of methacrylamidopropylhydroxyethyldimethyl ammonium acetate was prepared in an aqueous medium. A 50 g sample of the aqueous solution of methacrylamidopropylhydroxyethyldimethyl ammonium acetate, made in Example III, was diluted with 50 g of deionized water, purged with nitrogen at 30° C. for one hour and polymerized in the presence of 0.4 g of 2,2'-azobis-(2-methyl-propionitrile) at 65° to 70° C. for three hours. The resulting cationic polymer solution was useful as a flocculant for anionic surfactants. Several aqueous solutions of anionic surfactant, namely, 0.1% sodium lauryl sulfonate, 250 ml; 0.1% Conoco C-650 linear alkyl sulfonate, 250 ml; and Neodol 25-3S alkyl sulfonate, 250 ml, were treated with 1.0 ml of the above prepared cationic polymer solution. In each case flocculation occurred instantaneously. After removal of the precipitate, the anionic surfactant in the filtrate was reduced to <10 ppm level from the original 0.1% level.

In addition to the just disclosed utility of the compounds of the invention as polyurethane or polyisocyanurate catalysts, and as coagulants the cationic monomers also find use in additional areas of utility. For example, the cationic monomers, or polymers, copolymers or interpolymers, resulting therefrom may be used as retention aids for fiber furnishes in the paper industry, as additives used for improving drainage through the wire surface of Fourdrinier machine, as additives in cellulosic materials for the purpose of retaining dye added thereto, as polyelectrolytes in the coagulation of low turbidity water, and as additives useful in the flocculation or de-watering of sewage, the settling of coal slurries, the coagulation of rubber latex, and the breaking of oil-in-water emulsions. Likewise, the monomers, homopolymers or interpolymers thereof may be used as additives in a number of processes or employed per se to produce a variety of manufactured articles. For example, solutions of resulting polymers may be cast or spun into shaped articles, sheets, films, wrapping tissues, tubing, filaments, yarns, threads, etc. As other examples, aqueous or alcoholic solutions of polymers made from the cationic monomers described here may be used in coating, finishing casting or molding for adhesion or lamination. Specifically, they may be used as adhesives for cellophane, paper, cloth, etc., as finishes for fabrics, as permanent sizes for yarns, as protective water resistant coverings, for use as sausage casings, as dye intermediates, as filament film formers, etc. The polymers may also find excellent use as anchoring agents for natural and synthetic filaments films and artificial leather. They may also be used to finish and impregnate or coat by surface modification or other manipulative techniques, a number of industrial and commercial articles.

When used as a catalyst in preparing polyurethane or polyisocyanurate polymers the compounds of the invention are employed in the conventional manner. That is, a polyol such as a polyether or polyester polyol is reacted with an aliphatic, or more often an aromatic polyisocyanate usually in the presence of a blowing agent. The catalysts here are then used in a conventional manner whereby rigid or flexible foams or elastomers are prepared. It is preferred that the compounds here be utilized as polyisocyanurate group formation catalysts.

While the invention has been described in connection with specific embodiments thereof, it will be understood that it is capable of further modification, and this application is intended to cover any variations, uses or adaptations of the invention following, in general, the principles of the invention and including such departures as come within known or customary practice in the art to which the invention pertains and as may be applied to the essential features hereinbefore set forth, and as fall within the scope of the invention and the limits of the appended claims.

The invention is hereby claimed as follows.

We claim:

1. An acrylamide or methacrylamide quaternary characterized by the following structural formula:

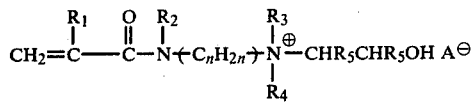

where $R_1$, $R_2$ and $R_5$ are hydrogen or methyl, $R_3$ and $R_4$ are lower alkyl, n is an integer ranging from 1 to 6 and A represents an anion.

2. The quaternary of claim 1 where n=3.

3. The quaternary of claim 2 where $R_3$ and $R_4$ are methyl.

4. The quaternary of claim 3 wherein $R_1$ is methyl and $R_2$ is hydrogen.

5. In a process for preparing a polymer containing recurring isocyanurate and urethane linkages, which polymer comprises the reaction product of a polyether or polyester polyol and an aromatic polyisocyanate, while utilizing an isocyanurate group formation catalyst; the improvement which comprises employing as said isocyanurate catalyst an acrylamide or methacrylamide quaternary which comprises a compound falling within the following structural formula:

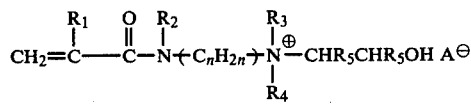

where $R_1$, $R_2$ and $R_5$ are hydrogen or methyl, $R_3$ and $R_4$ are lower alkyl, n is an integer ranging from 1 to 6 and A represents an anion.

* * * * *